June 3, 1947. F. P. STEWART 2,421,397
PAN MOTION BELT APPARATUS FOR ORE SEPARATION
Filed Aug. 18, 1943 5 Sheets-Sheet 1
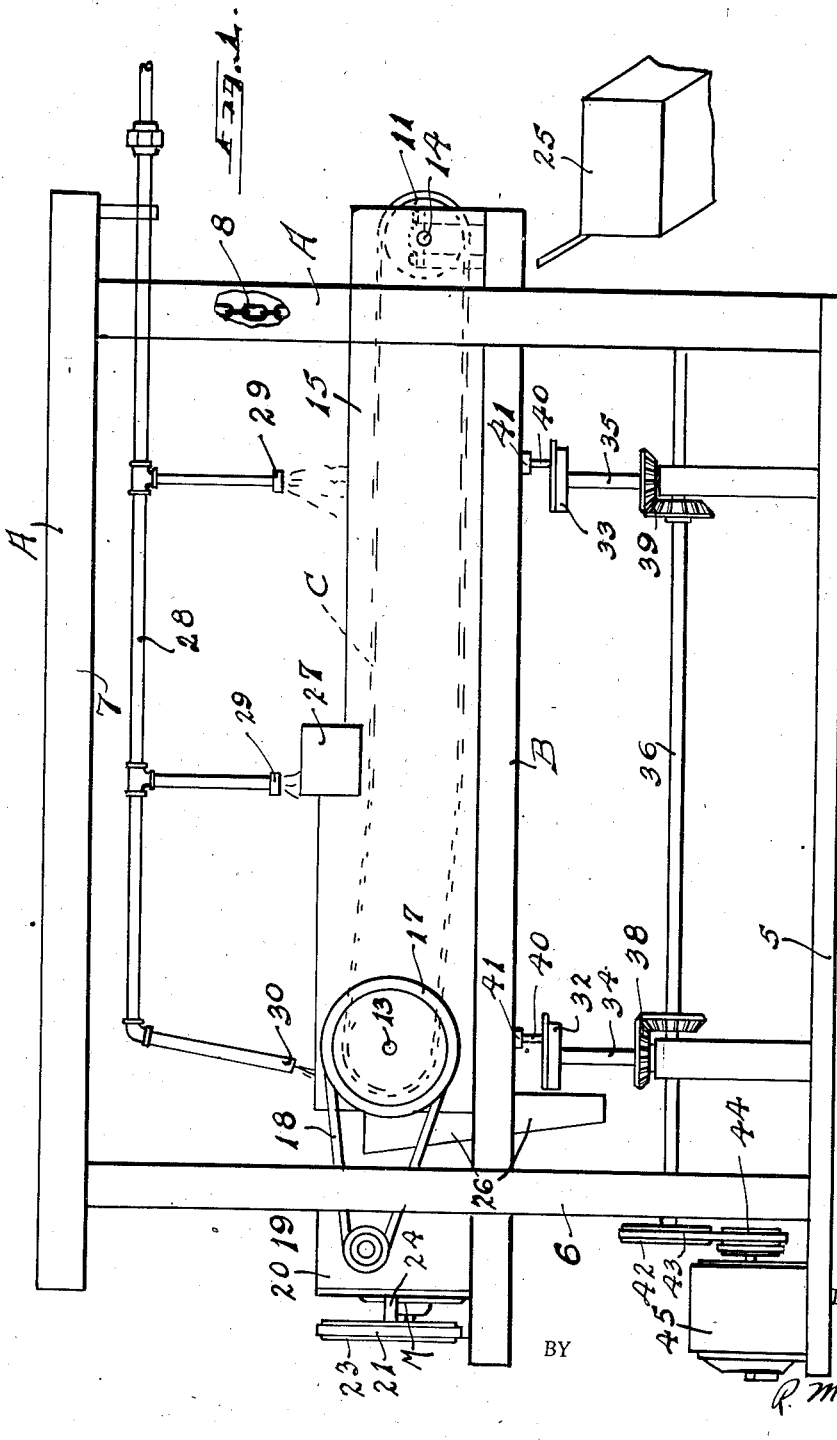
INVENTOR.
Frank P. Stewart
BY R. M. Thomas
Attorney June 3, 1947.　　　　F. P. STEWART　　　　2,421,397
PAN MOTION BELT APPARATUS FOR ORE SEPARATION
Filed Aug. 18, 1943　　　5 Sheets-Sheet 2
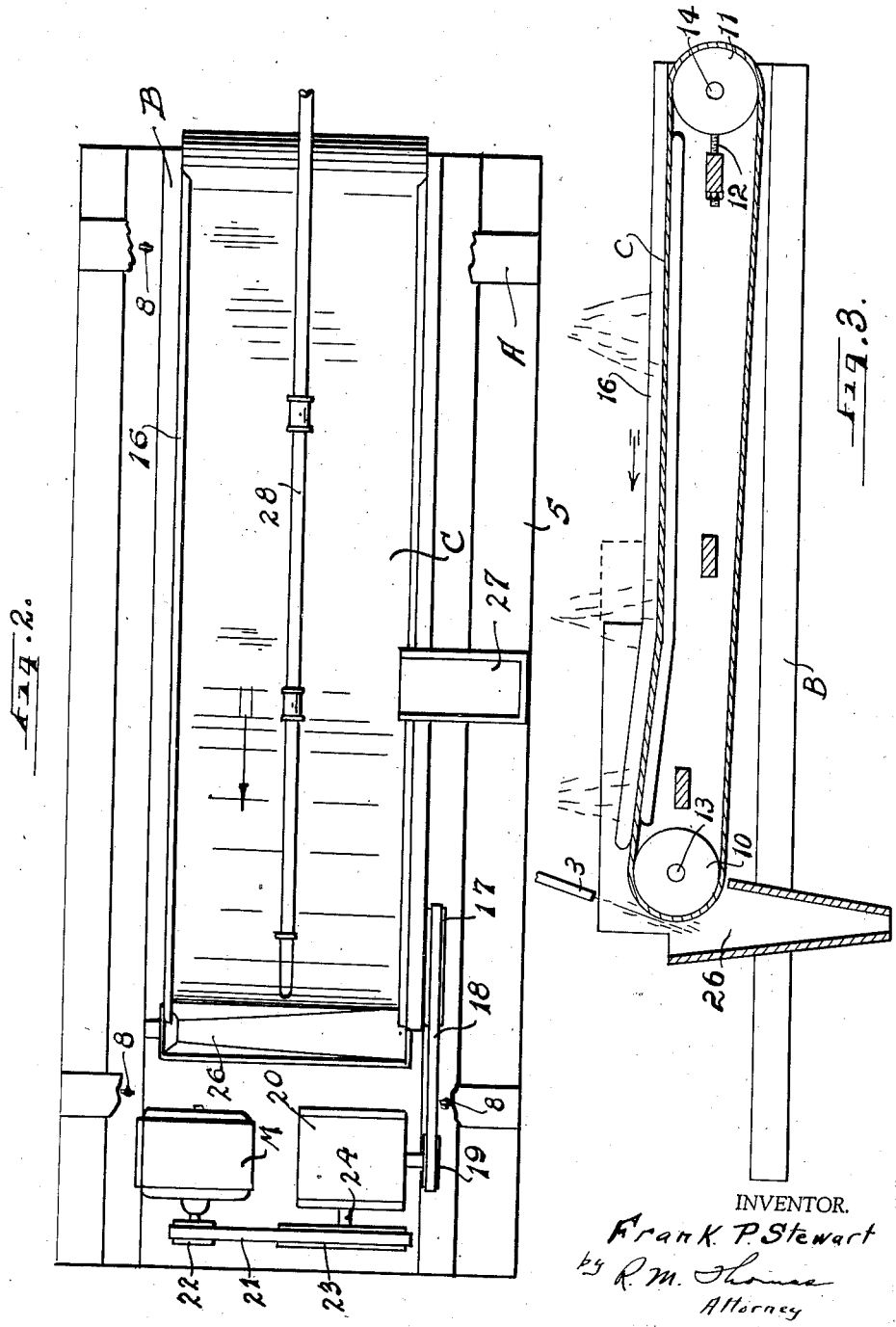

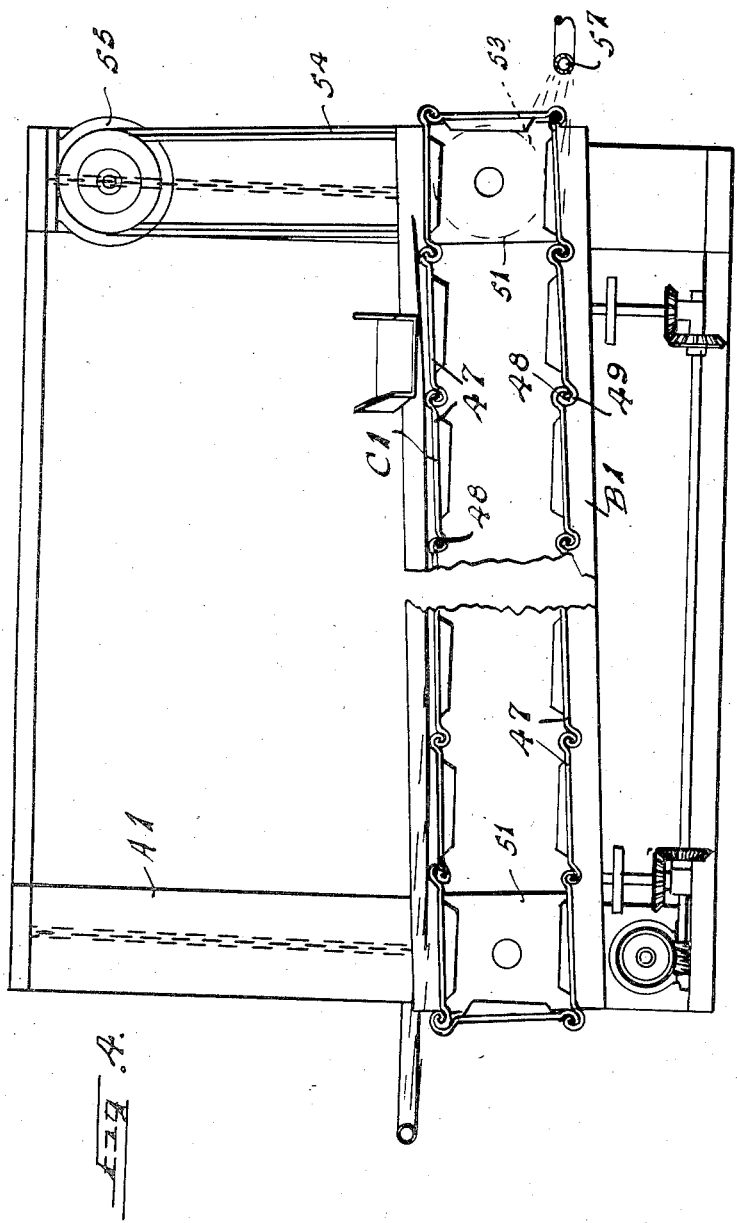

June 3, 1947.  F. P. STEWART  2,421,397
PAN MOTION BELT APPARATUS FOR ORE SEPARATION
Filed Aug. 18, 1943  5 Sheets-Sheet 4
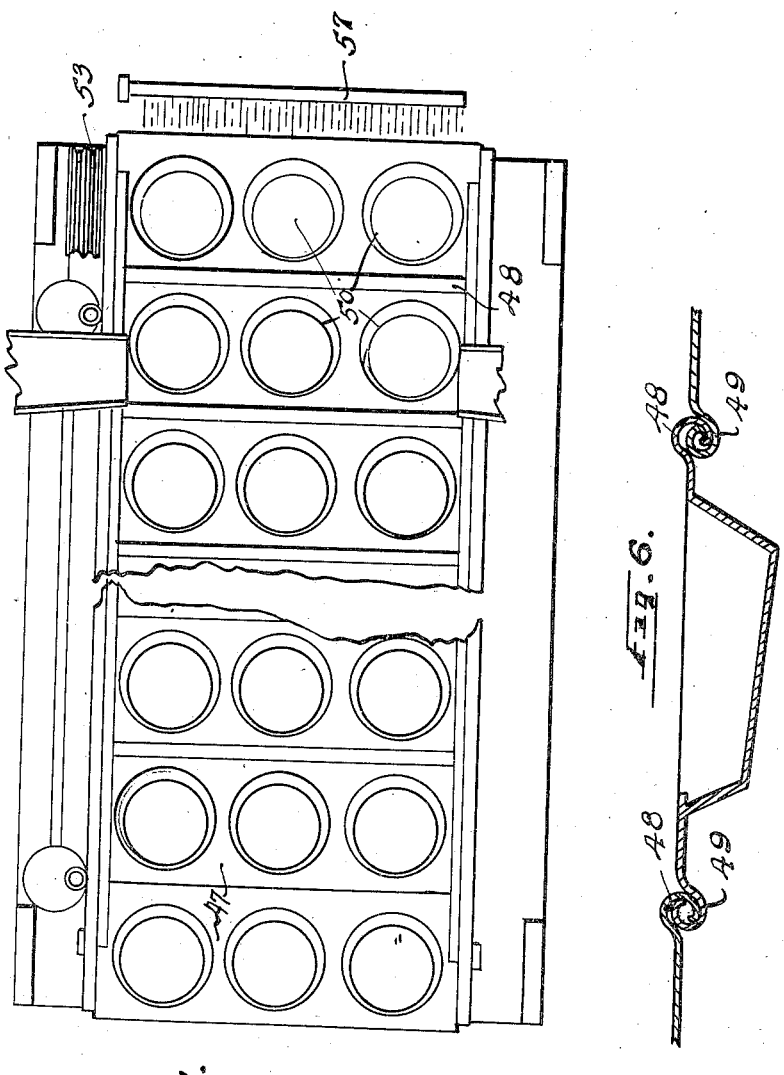
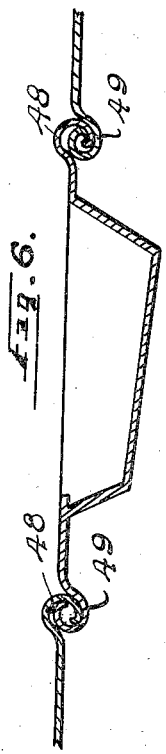
Inventor
Frank P. Stewart
By R. M. Thomas
Attorney

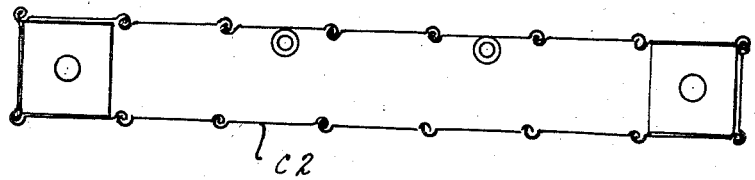
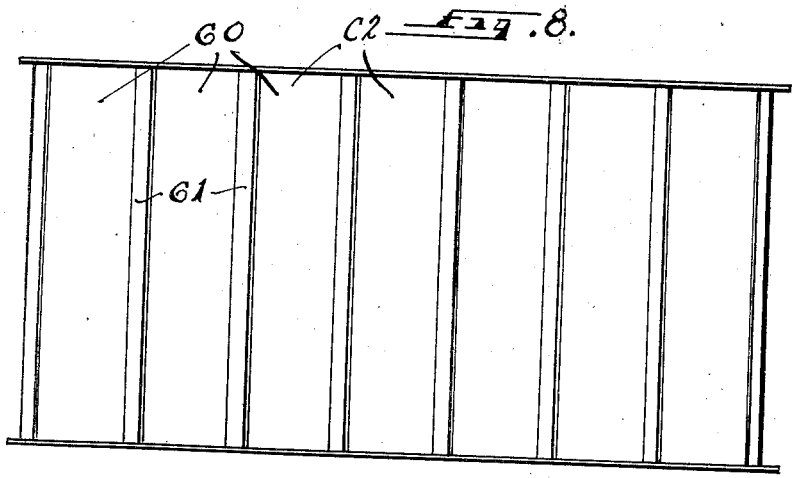
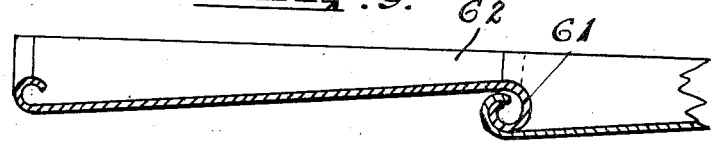
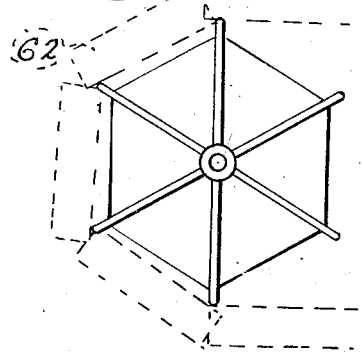

Patented June 3, 1947

2,421,397

UNITED STATES PATENT OFFICE 2,421,397

PAN MOTION BELT APPARATUS FOR ORE SEPARATION

Frank P. Stewart, Salt Lake City, Utah

Application August 18, 1943, Serial No. 499,065

1 Claim. (Cl. 209—433)

My invention relates to ore reduction and has for its object to provide a new and highly efficient method of an apparatus for separating the heavier from the lighter materials in smelting and refining plants where much iron and other heavy fines are lost even though they have been passed through various flotation cells to recover them.

This invention permits the passage of these materials directly onto an endless belt which is driven slowly in one direction with an incline at the end toward which the fine valuable materials are carried. The material is fed in at the point of incline of the belt and all dross is discharged from lower waste end while all of the heavy values are elevated and fed over the top end of the belt by the rotation of the belt together with a rotary motion which is transmitted to the entire belt assembly so that the belt and all its operating parts together with all materials fed thereon are caused to be treated to a rotary motion or circular motion and any given point or particle of material completes a circular motion around a given axis to compact or pack the fine heavy particle of 200 mesh or finer onto the belt so that they will be elevated and separated from the dross.

The circular motion causes the fine material to pack while the larger insolubles are rolled off over the top although in some cases the larger particles may be heavier than the fines.

The endless belt may be a solid one piece fabric or rubber belt of the type used for conveyors or may be made of a multiplicity of flat metal or plastic sheets interlocked at their ends to form an endless belt. When of the latter type the belt will be carried on square pulleys at each end thereof but should it be desired the end pulleys may be hexagonal or octagonal in form to overcome the elevation of the belt when the pulley is being rotated.

This invention is an improvement over my former Patent No. 2,256,504, dated Sept. 23, 1941, and is a development necessary for handling certain types of heavies other than those designated as gold in the former application.

These and many other objects I accomplish with the device illustrated in the accompanying drawings in which similar numerals and letters of reference indicate like parts throughout the several views and as described in the specification forming a part of this application and pointed out in the appended claim.

In the drawings in Figure 1 I have shown a side elevation of the machine.

Figure 2 shows a plan view of the machine parts cut away for clarity.

Figure 3 is a section longitudinally of the endless belt and its associated platform.

Figure 4 is a longitudinal section of the type of device in which the endless belt is made of individual sections interlocking as a link belt.

Figure 5 is a plan view of the endless belt and framework therefor.

Figure 6 is an enlarged sectional view of one section of the link type belt showing the use of my wash collecting pans therein.

Figure 7 is a diagrammatic longitudinal section showing the use of square pulleys for driving the endless link type of belt.

Figure 8 is a plan view of Figure 7.

Figure 9 is an enlarged section of one of the links and the beginning of another.

Figure 10 is an end view of a hexagonal pulley used when the square pulley will not meet the requirements.

In the drawings I have shown the invention as mounted in a framework A consisting of a base 5, uprights 6 and 7. Suspended from chains or cables 8 I provide a main rotatable body B. This body consists of stringers and cross pieces to make a frame on and in which the endless belt C of the invention is operated. The endless belt C is mounted on two spaced apart rollers 10 and 11. The roller or drum 10 is the driving drum and the drum 11 is the driven or idler drum and is provided with tension screws 12 to take up the slack in the belt.

The two drums operate on shafts 13 and 14 between sidewall pieces 15 and 16 and a sheave wheel 17 is mounted on the end of the shaft 13 which extends beyond the side piece 15. This sheave is driven by a belt 18 from a drive sheave 19 driven by a reduction gear assembly mounted in the casing 20. A motor M drives the reduction gears through a belt 21, sheave 22 on the motor and sheave 23 driving the shaft 24 of the reduction gears. A tailings flume 25 is mounted below the discharge end of the endless belt to catch the tailings from the machine. A launder 26 catches the values as they are discharged from the elevated end of the endless belt. A side feeder trough 27 feeds the material being treated onto the endless belt either from one side or the other. Longitudinally of the machine and spaced thereabove I provide a water spray pipe 28 having jets 29 and 30 extending down therefrom to spray the material as it passes over the endless belt and the jet 30 of water is sprayed onto the eleavted end of the belt where it passes around the pulley 10 to dislodge the values so they will fall into the launder 26. Most of the water used on the belt is introduced with the material being treated when it enters the feeder trough 27. More than one feeder trough may be provided or the feed may be from an elevated feed trough with ports downwardly extended to carry the feed entirely across the machine.

The circular motion is transmitted to the endless belt C and its supporting framework B by providing two spaced cams 32 and 33 mounted on the top end of vertical shafts 34 and 35, and driven from a common drive shaft 36 by sets of beveled gears 38 and 39. Each cam is provided with a connecting rod or link 40 extending up and operating in a socket 41 on the underside of the framework B.

The shaft 36 is driven by a sheave 42, a belt 43 and sheave 44 operated by a motor 45. Thus when the motor is operating the shaft 36 is rotating, in turn rotating the bevel gears 38 and 39 which transmits motion to the vertical shafts 34 and 35 rotating the cams 32 and 33, transmitting the rotary motion to the entire framework B and belt C. The position of the rods 40 of the cams may be varied in relation to the axis of the cams thereby changing the size of the circular motion transmitted to the belt C to adapt the machine for various uses with different materials.

In Figures 4, 5, and 6 I have shown a modification of the invention in which a framework B1 is supported from a support frame A1, and an endless belt C1 is made of a multiplicity of flat links 47 each being formed with one edge as an engaging joint 48 and the other edge formed as in interengaging joint 49. These joints may be made either as shown in Figure 9 or as in Figure 6. They constitute elongated tubular portions having one open slot with the edge of the next link formed with an engaging tubular portion with the slot reversed, and on the upper side of the link. In some cases the links will be formed with concentrate pans 50 formed therein to catch the values on the belt. The belts are driven by square pulleys 51 at each end thereof or as shown in Figure 10 the pulleys may be made hexagonal in form to eliminate the spread of the belt when passing over the corners of the square pulleys as they rotate. One of the pulleys is driven by sheave wheel 53 which is driven by a belt 54 extending down from a motor 55 mounted in the top of the framework A1. With this type of drive the motor does not have to be carried on the support framework B1.

Each side of the framework B1 is provided with sidewalls in which the shafts of the square pulleys are mounted in suitable bearings and suitable guide rollers may be provided to support the belt or side strips on which the belt rests may be provided as in Figures 1 to 3 inclusive illustrate.

The rotary motion is transmitted to the framework B1 in the same manner as that of the other figures. Feed troughs and tailings troughs will also be provided and the belt will be sprayed by the same type of sprays as shown in Figures 1 and 2 with the addition that another clean up spray 57 may be mounted along the end of the framework where the values are concentrated to wash the values from the links of the belt.

Figures 7 to 9 illustrate the forming of the endless belt C2 as made of metal or plastic links 60 without any depressions therein. The belt may be driven in either direction with this type of belt depending upon the use to which it is being placed and in some cases the hinge connection 61 may act as a riffle when traveling in a direction that the hinge will be catching the fines therebefore. Sidewalls 62 may be used in the links where and when necessary as shown in Figures 9 and 10.

Having thus described my invention I desire to secure by Letters Patent and claim:

An ore separation device comprising a framework; a drive motor mounted on the base of the framework; a horizontal shaft driven from the motor; spaced vertical shafts driven from the horizontal shaft; an eccentric mounted on the top end of each vertical shaft; a rotatable body suspended at each corner by flexible means depending from the top of the framework; cam rods extending up from the eccentric cams to engage the bottom of the rotatable body to transmit rotary motion to the rotatable body; a driving drum mounted transversely of said rotatable body; a driven drum mounted at the other end of said body at a level slightly lower than the first drum; a flexible belt carried on said drums; guide means extending inwardly from the sides of the rotatable body said guide means to guide the main portion of the upper stretch of endless belt between the drums on a substantially horizontal plane and permit the end near the driving drum to incline upwardly adjacent thereto for a short distance; a drive motor mounted at one end of the rotatable body; a gear reduction device driven by said motor; means to drive the upper drum from the gear reduction device; a discharge launder mounted at the upper end of the endless belt and extending through the rotatable body and rotatable therewith to insure positive collection of all values from the endless belt; a feed trough mounted to feed ore onto the endless belt adjacent the inclined area thereof; a water pipe mounted above the endless belt; spaced sprays extending down to spray the material as it is carried up the belt and along its upper carrying surface; and a cleaner spray extending down from the end of said pipe to dislodge the values from the drum end of the belt into the discharge launder to clean the belt of all values.

FRANK P. STEWART.

REFERENCES CITED

The following references are of record in the file of this patent:

UNITED STATES PATENTS

| Number | Name | Date |
|---|---|---|
| 142,419 | Tolle | Sept. 2, 1873 |
| 145,771 | Wheeler | Dec. 23, 1873 |
| 329,862 | Stephens | Nov. 3, 1885 |
| 702,541 | Cohen | June 17, 1902 |
| 552,519 | Ellis | Jan. 7, 1896 |

FOREIGN PATENTS

| Number | Country | Date |
|---|---|---|
| 329,030 | Great Britain | May 15, 1930 |